United States Patent
Devarajan et al.

(10) Patent No.: US 12,107,754 B2
(45) Date of Patent: Oct. 1, 2024

(54) ROLE INFORMATION PROPAGATION IN ACCESS SWITCHES

(71) Applicant: HEWLETT PACKARD ENTERPRISE DEVELOPMENT LP, Houston, TX (US)

(72) Inventors: Venkatavaradhan Devarajan, Bangalore (IN); Vinayak Joshi, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 411 days.

(21) Appl. No.: 17/712,342

(22) Filed: Apr. 4, 2022

(65) Prior Publication Data

US 2023/0318961 A1 Oct. 5, 2023

(51) Int. Cl.
*H04L 45/02* (2022.01)
*H04L 9/40* (2022.01)
*H04L 12/46* (2006.01)

(52) U.S. Cl.
CPC .......... *H04L 45/02* (2013.01); *H04L 12/4641* (2013.01); *H04L 45/04* (2013.01); *H04L 63/08* (2013.01); *H04L 63/105* (2013.01)

(58) Field of Classification Search
CPC ..... H04L 45/02; H04L 12/4641; H04L 45/04; H04L 63/08; H04L 63/105; H04L 2012/4629; H04L 12/4633; H04L 12/4675; H04L 49/3009; H04L 45/745; H04L 49/354; H04L 63/101
See application file for complete search history.

(56) References Cited

U.S. PATENT DOCUMENTS

2018/0309596 A1* 10/2018 Brissette ............. H04L 12/4679

* cited by examiner

*Primary Examiner* — Charles C Jiang
*Assistant Examiner* — Shawn D Miller
(74) *Attorney, Agent, or Firm* — Hewlett Packard Enterprise Patent Department

(57) ABSTRACT

In an example, a switch may receive an authentication request from a host associated with a first wireless access point (WAP) connected to the switch. The switch acts as a VXLAN Tunnel Endpoint (VTEP) in a Border Gateway Protocol (BGP) Ethernet Virtual Private Network (EVPN) based Virtual Extensible Local Area Network (VXLAN). The switch forwards the authentication request to an authentication server and on successful authentication of the host, may associate a role information with the host based on an authentication response from the authentication server. Further, the switch may create a BGP extended community field carrying the role identifier indicative of network policies to be implemented for the host and attach the BGP extended community field with a route advertisement. The switch then sends the route advertisement to another switch. The another switch is configured as a peer VTEP in the VXLAN. The switch and the another switch is configured in a single Virtual Local Area Network (VLAN).

20 Claims, 5 Drawing Sheets

ROLE INFORMATION PROPAGATION IN ACCESS SWITCHES

BACKGROUND

Communication networks are often segregated into three layers, i.e., a core layer, an access layer, and a distribution layer. The core layer provides high-speed communication capability to network devices, such as switches and routers, located in the distribution and access layers. The access layer provides communication capability to host devices. The distribution layer acts as an interface between the core layer and the access layer. It manages routing, filtering, and communication network quality of service (QoS) policies.

Communication network topologies may be arranged with physical links connecting switches. Multiple physically linked switches may form a local area network (LAN). A collection of such LANs may form the network access layer. Switches in the access layer may be connected to one or more Wireless Access Points (WAPs). The WAPs may serve as points of access for wireless host devices.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

Communication network deployments, such as campus area networks (CANs), may include an interconnection of Local Area Networks (LANs) and Wireless Access Points (WAPs) connected to LAN switches. The switches may be connected to the WAPs over physical links. They may function as network attachment points for the WAPs. A switch in the access layer, also called an access switch, may be connected to one or more WAPs. Each WAP may serve wireless host devices, such as laptops and cell phones, within a specific range. For example, a WAP may serve a particular floor of a building of a campus where a CAN is deployed. A host device moving between different floors of the building may transition or roam between WAPs serving the different floors to maintain connectivity.

In some examples, to enable seamless movement of the host devices within the network, WAPs employ fast roaming techniques. Fast roaming may allow a mobile host device to move about in the network without disconnecting or dropping from the network. Fast roaming techniques may help the host devices roam to a new WAP without re-reauthenticating. To avoid host reauthentication, WAPs in the same access layer may share host device authentication information.

Host device information shared among WAPs may include network prefixes and IP addresses. To share such information securely, access switches often form Virtual Extensible Local Area Networks (VXLANs) which exchange control plane information using Ethernet Virtual Private Network (EVPN). The control plane information includes information in a switch routing table that defines what to do with incoming packets. VXLAN is a network virtualization technology that uses an encapsulation technique to encapsulate Open Systems Interconnection (OSI) layer 2 Ethernet frames within layer 4 User Datagram Protocol (UDP) datagrams. VXLAN endpoints, which terminate VXLAN tunnels and may be either virtual or physical switch ports, are known as VXLAN tunnel endpoints (VTEPs). EVPN is based on Border Gateway Protocol (BGP) which allows network prefix and IP address sharing in the form of Network Layer Reachability Information (NLRI). The access switches act as VTEPs, also referred to as VXLAN peers, which exchange BGP EVPN update messages to share NLRI between them. The exchange of NLRI allows the access switches in the VXLAN to know which host device is connected to which access switch via which WAP and forward data accordingly.

However, different host devices connecting to the network may be subjected to different network policies depending on their role information. Network policies may include rules, permissions, conditions, and settings that define which host devices are authorized to connect to the network and the circumstances under which different host devices are allowed to connect to the network. The role information is indicative of a group or category of host device users. Network policies applied to each the host device may be determined based on such role information. Examples of roles may include, Guest, Student, Employee, Sales, Leadership, etc. Examples of network policies applied to such roles may include various conditions. For example, a "Guest" cellphone may not be allowed to use an office network for more than one hour. As another example, a "Student" host may be blocked from accessing certain URLs. With BGP EVPN VXLANs implemented in the access switches, notwithstanding that host device NLRI is shared between the access switches, the access switches remain unaware of the host device role information. This poses a challenge in implementing role-based network policies, particularly when a host device roams from a first WAP to a second WAP, where the first and second WAPs are connected to two different access switches.

When a host device first connects to a network, the first WAP may receive role information. That is because role information may be provided to the WAP during authentication. For example, the WAP may act as a proxy for an authentication service such as Remote Authentication Dial-In User Service (RADIUS) or RADIUS over Transport Layer Security (TLS). However, when the host device roams from the first WAP to a second WAP in the same access layer, the second access switch to which the WAP is connected may not be aware of the host device role. Access switches generally do not share host device role information between them. Thus, although the host device may seamlessly transition between the first and second WAPs owing to fast roaming, and data may be correctly routed to through the second WAP due to NLRI sharing, the second access switch may not be able to implement the role-based network policies. Without appropriate implementation of the network policies at the second access switch, conditions of data exchange with the host device may not be correctly applied. This may affect overall network performance, throughput, and security. It may also expose network nodes to vulnerabilities or overload. This may lead to security threats or break downs that affect service availability.

The present disclosure describes techniques of incorporating host device role information within BGP update message advertisements to share the role information among access switches in a VXLAN network. Thus, when BGP update message advertisements are shared between access switches, they also receive role information associated with particular host devices. This allows role information to be distributed between access switches. The access switches can implement network policies based on the role information. This allows the host devices to roam seamlessly between network switches while maintaining role-appropriate network policies. Further, using the BGP EVPN infrastructure to communicate the role information avoids the need to incur overhead associated with a new role information communication protocol. This may help remove barriers to scalability.

In an example a network switch is described. The network switch, also referred to as a switch, includes a processor and a non-transitory, computer-readable medium including instructions that, when executed by the processor, cause the switch to receive an authentication request message from a host device associated with a first WAP connected to the switch. The switch may be configured as a VTEP in a BGP EVPN based VXLAN. In the VXLAN there may be other switches configured as peer VTEPs. The switches may be configured in a single Virtual Local Area Network (VLAN) to allow fast roaming of host devices between WAPs connected to these switches. The switch forwards the authentication request message to an authentication server, such as a RADIUS server. In response to successful authentication of the host device, the switch associates a role information with the host device based on an authentication response message from the authentication server. The switch adds a role identifier in a route advertisement message of the host device based on the role information. The route advertisement message is indicative of a mapping between an Internet Protocol (IP) address of the host device and a Media Access Control (MAC) address of the host device. In an example, to add the role identifier, the switch creates a BGP extended community field carrying the role identifier indicative of network policies to be implemented for the host device and attaches the BGP extended community field with the route advertisement message. The switch the sends the route advertisement message to another switch and on receipt of the route advertisement message the other switch is aware of the network access policies to be implemented for the host device. In the event of the host device transitioning from the first WAP to a second WAP connected to the other switch, the other switch is aware of the role information of the host device based on the role identifier in the received route advertisement message. Using the role identifier in the route advertisement message, the other switch may configure its data plane to enforce the network policies for the host device and may accordingly forward traffic to/from the host device associated with the second WAP. Thus, role information of the host device is propagated between switches and consequently, the switches may implement network policies based on the role of the host device even if the host device roams across WAPs connected to different access switches.

The described systems and methods may be implemented in various switches implementing functionalities of a network switch in an access layer in a communication network. Although, the description above is with reference to access switches, the methods and described techniques may be implemented in other type of switches implementing different communication techniques, albeit with a few variations. Various implementations of the present subject matter have been described below by referring to several examples.

The above systems and methods are further described with reference to FIG. 1A to FIG. 4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1A:
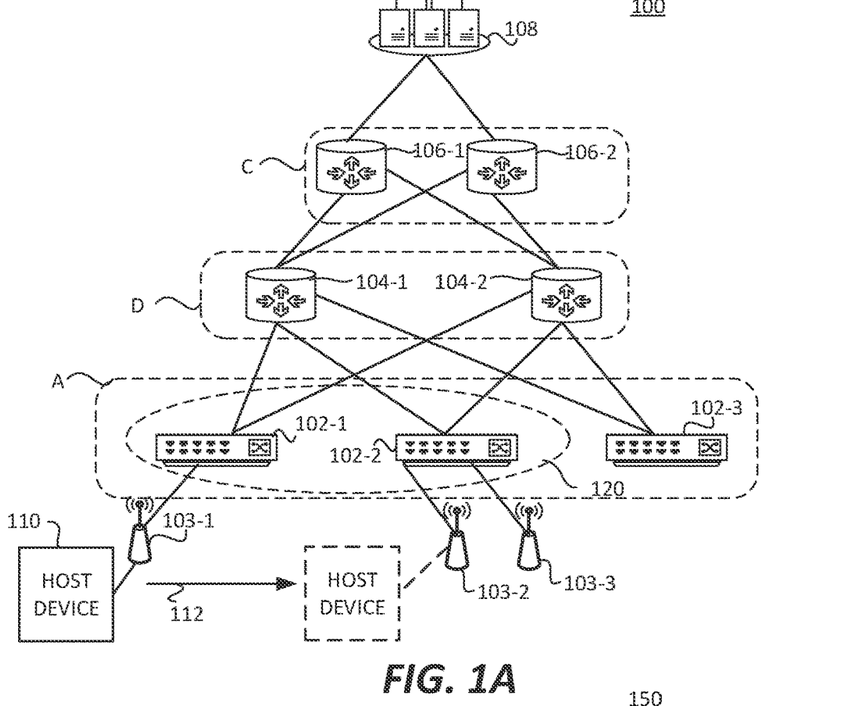
FIG. 1A schematically illustrates a computing network, implementing a wired network switch for role information propagation, according to an example.

FIG. 1A schematically illustrates a computing network 100, according to an example of the present subject matter. The computing network 100 may be, for example, a public distributed environment, a private closed computing environment, etc. The computing network 100 may be implemented for an organization, such as a business, educational institution, governmental entity, healthcare facility or other organization. This diagram illustrates an example of a configuration implemented with an organization having multiple users (or at least multiple host devices). The computing network 100 may be implemented at a geographical site which may include a primary network, which can be, for example, an office network, home network or other network installation. The primary network may be a private network, such as a network that may include security and access controls to restrict access to authorized users of the private network. Authorized users may include, for example, employees of a company at the geographical site, residents of a house, customers at a business, students in school and so on. In an example, the computing network 100 is a campus area network (CAN).

According to an example of the present subject matter, the computing network 100 may include an access layer A, a distribution layer D, and a core layer C, as shown in FIG. 1. The access layer A may implement a plurality of network switches, such as switch 102-1, switch 102-2, and switch 102-3. For ease of explanation, the switch 102-1, the switch 102-2, and the switch 102-3, are commonly referred to as switches 102, hereinafter. Further, the terms network switch and switch have been used interchangeably in the description. Each of the switches 102 may provide connectivity between one another and between hosts. Each of the switches 102 may be implemented as, but not limited to, an access layer switching unit, a switch-router, or any device capable of switching data packets at the access layer A and provide connectivity between devices in the distribution layer D and the host devices and between the host devices.

Each switch 102, may connect to one or more WAPs. As shown in FIG. 1, switch 102-1 is connected to WAP 103-1 and switch 102-2 is connected to WAPs 103-2 and 103-3.

WAP 103-1, WAPs 103-2 and 103-3 are collectively referred as WAPs 103. In an example, each of the switches 102 may be access switches and facilitate host devices to connect to the computing network 100. Each of the switches 102 include multiple ports. In an example, a network administrator may designate a port in a switch 102 as a network port or a wireless access port. The network port acts as an interface between the switch 102 and network devices in upper layers, such as the distribution layer D. The wireless access port acts as an interface between the switches 102 and WAPs 103, connected to the switches 102.

WAPs 103, are included as examples of point of access to the computing network 100 for wireless host devices, such as the host device 110. The WAPs 103 may control network access of the host device 110 and may allow authentication of the host device 110 for connecting to the WAPs 103 and through the WAPs 103, to other devices within the computing network 100. The WAPs 103 may allow this authentication using the switches 102 and an authentication server, such as a RADIUS or RADSec server (not shown). Each of WAPs 103 may be a combination of hardware, software, and/or firmware that is configured to provide wireless network connectivity to wireless host devices. In the illustrated example, WAPs 103 may be implemented in a distributed WLAN architecture, where the WAPs 103 provide independent distributed intelligence but work together as a system to cooperatively provide control mechanisms.

Switches 102-1 and 102-2 are configured in a single broadcast domain. A broadcast domain may be understood as a logical division of a computer network, in which all nodes can reach each other by broadcast at the data link layer. A broadcast refers to transmission of a data packet to every device on a network. A broadcast domain may be within the same LAN segment or it can be bridged to other LAN segments. In an example, a single VLAN 120, is configured in the switches 102-1 and 102-2. For example, a common VLAN identifier may be configured for the wireless access ports in each of the switches 102-1 and 102-2 connecting to the WAPs 103-1, 103-2, and 103-3.

The distribution layer D includes network devices 104-1 and 104-2 for managing connectivity between the wired network devices 102 in the access layer A and the core layer C. The core layer C may include network devices 106-1 and 106-2. Examples of the network devices 106-1 and 106-2 may include a router, a layer 3 switch, etc. The network devices 106-1 and 106-2 connect the devices in the distribution and access layers with a datacenter 108. The datacenter 108 may connect with one or more devices in an external network or the Internet.

Figure 1B:
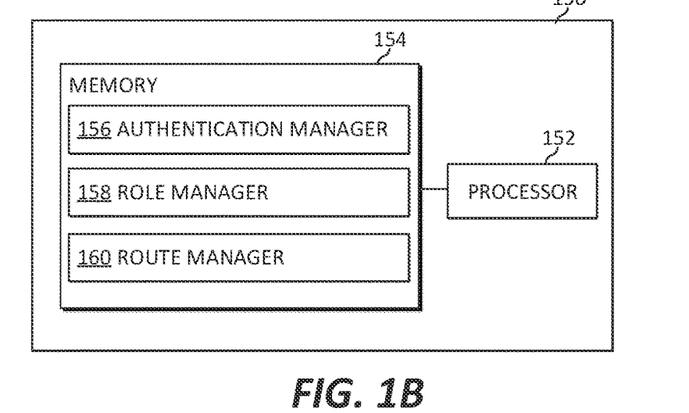
FIG. 1B is a block diagram of an example network switch for role information propagation, according to an example.

Turning now to FIG. 1B an example network switch 150 is shown. The switch 150 may be similar to one or more of the switches illustrated in FIG. 1A, such as the switch 102-1, switch 102-2, and switch 102-3 in the access layer A. The switch 150 may include a processor 152 and a memory 154 that may be coupled to each other through a communication link (e.g., a bus). Processor 152 may include a single or multiple Central Processing Units (CPU) or another suitable hardware processor(s), such as a network ASIC. Memory 154 may be a machine-readable storage medium that may store machine readable instructions executed by processor 152. The memory 154 may include any suitable combination of volatile and/or non-volatile memory, such as combinations of Random Access Memory (RAM), Read-Only Memory (ROM), flash memory, and/or other suitable memory.

The memory 154 includes a non-transitory, computer-readable medium including instructions that may be executed by the processor 152. The memory 154 stores instructions to be executed by the processor 152 including instructions for authentication manager 156, role manager 158, and route manager 160.

The processor 152 may execute authentication manager 156 to receive an authentication request message from a host device associated with a first WAP connected to the network switch 150. In an example, the network switch 150 may be configured as a VTEP in a BGP EVPN based VXLAN. In an example, the authentication manager 156 may be in communication with an authentication server, such as a RADIUS/RADSec server and may include a proxy authentication service. In an example, the authentication request message may be a RADIUS access request originating from the host device. The RADIUS access request may include access credentials, such as username and password or security certificate provided by the user and network address of the host device.

The processor 152 may execute the authentication manager 156 to forward the authentication request message to the authentication server. Based on the access credentials, the authentication server may authorize the host device for access. In an example, in response to successful authentication of the host device, the authentication server may send an authentication response message to the authentication manager 156 in the network switch 150. The authentication response message may be, for example, a RADIUS: Access-Accept message indicative of grant of network access to the host device. In an example, the authentication server may return a role information of the host device with the authentication response message. The role information of the host device is indicative of a purpose or function for which a user of the host device connects to the network. Based on the role information of the host device, network policies for access are applied on the host device.

In response to successful authentication of the host device, the processor 152 may execute the role manager 158 to associate the role information with the host device based on the authentication response message from the authentication server. Associating the role information with the host device includes implementing network policies at the switch 150 based on the role of the host device.

Further, the processor 152 may execute the role manager 160 to add a role identifier in a route advertisement message of the host device based on the role information. The role identifier indicative of network policies to be implemented for the host device. In an example, the role identifier is a 16-bit value indicative of the role associated with the host device upon authentication. The route advertisement message may be a BGP EVPN type 2 route indicative of a mapping between an Internet Protocol (IP) address of the host device and a Media Access Control (MAC) address of the host device. For example, the route advertisement message may include an IP address of the host device mapped to a MAC address of the host device and an Address Resolution Protocol (ARP) entry. BGP is a routing protocol that makes dynamic routing decisions based on paths, network policies, etc., and enables exchange of routing and reachability information among network devices, such as switches, connecting through BGP. BGP may enable two remote sites connected through a VPN tunnel to exchange routing information. EVPN may use a Multiprotocol-BGP (MP-BGP) mechanism and define a new sub-address family, such as an EVPN address family, in a Layer 2 VPN address family. In the EVPN address family, an EVPN Network Layer Reachability Information (NLRI) may be added. EVPN NLRI may define several types of BGP EVPN routes, which carry information such as the host IP address, MAC address, and VXLAN Network Identifier (VNI). After a switch 102 acting as a VTEP learns the IP address and MAC address of a connected host, the VTEP can send the information to other switches (VTEPs) through the BGP EVPN routes. In this way, learning of host IP address and MAC address information can be implemented in the control plane of a BGP EVPN based VXLAN. Thus, control plane information between the switches 102 may be exchanged using the BGP EVPN routes. Such a BGP EVPN route including MAC address to IP address mapping for a host device is referred to as a BGP EVPN type 2 route.

Further, the processor 152 may execute the role manager 160 to create a BGP extended community field carrying the role identifier. In an example, a BGP community includes a group of destinations that share a common property. Information regarding the BGP community is included as a path attribute in BGP update messages. BGP update messages are generally used between VTEPs in a BGP EVPN based VXLAN for exchanging NLRI. The information regarding the BGP community identifies community members and allows actions to be performed on the group of destinations. The BGP extended community field may be manufacturer-specific or vendor-specific.

The processor 152 may execute the role manager 158 to attach the BGP extended community field with the route advertisement message. The route advertisement message may be a BGP EVPN type 2 route indicative of a mapping between an Internet Protocol (IP) address of the host device and a Media Access Control (MAC) address of the host device. In an example, attaching the BGP extended community field may include tagging an attribute in a BGP EVPN type 2 route shared between BGP EVPN peers in a VXLAN.

Further, the processor 152 may execute the route manager 160 to send the route advertisement message to another network switch. The another network switch is configured as a peer VTEP in the VXLAN. On receipt of the route advertisement message the other switch is aware of the network access policies to be implemented for the host device. The network switch and the another network switch is configured in a single Virtual Local Area Network (VLAN).

Turning again to FIG. 1A, the host device 110 may send an authentication request message to the WAP 103-1 to access the network 100. The host device 110 may be a wireless host device with capabilities to connect with WAPs. Examples of the host device 110 may include a laptop, smartphone, tablet, etc. The WAP 103-1 may forward the authentication request to the switch 102-1. In an example, the switch 102-1 may interact with an authentication server (not shown) to process the authentication request message. The authentication request may include access credentials, such as username and password of the host device.

Based on the access credentials the authentication server, such as RADIUS, may validate the identity of the host device and authorize network access for the host device. In an example, an authentication manager 156 in the switch 102-1 may include an authentication client proxy service which may forward the authentication request from the host device 110 to the authentication server (not shown). The authentication server may maintain a central database of user profiles. The authentication server matches the user credentials against the database of user profiles. If there is a match, the authentication server may check for role information associated with the user. The role information is indicative of a group/category of the user of the host device connecting to the network based on which network access policy or profile of the user is determined. The authentication server may send an authentication response message indicative of successful authentication of the host device 110. The authentication response message may include the role information of the user of the host device 110.

In response to successful authentication of the host device 110, the switch 102-1 may associate a role information with the host device based on the authentication response message from the authentication server. In an example, the role manager 158 of the switch 102-1 may configure data plane of the switch 102-1 to forward data based on the role information of the host device 110 and thus associate the role information with the host device 110. The data plane (also called forwarding plane) may include a combination of hardware and software in a switch that carries user traffic. The data plane allows data transfer to and from clients, handling multiple conversations through multiple protocols, and manages conversations with remote peers.

Since, the switch 102-1 receives the authentication response message from the authentication server and the authentication manager 156 in the switch 102-1 includes an authentication client proxy service, the switch 102-1 is aware of the role information of the host device 110 on receiving the authentication response message. In an example, the role manager 158 of the switch 102-1 may create a mapping between a MAC of the host device and the role information, say "Guest", from the authentication response message. In an example, the role identifier is a 16 bit numerical value indicating the role information of the host device. The role manager 158 may fetch a role identifier corresponding to the role information of the host device from a role identifier table. The role identifier table may include a mapping of role information to role identifier. In an example, the role identifier table may be stored in the switch 102-1 and may be predefined by a network administrator.

Figure 1C:
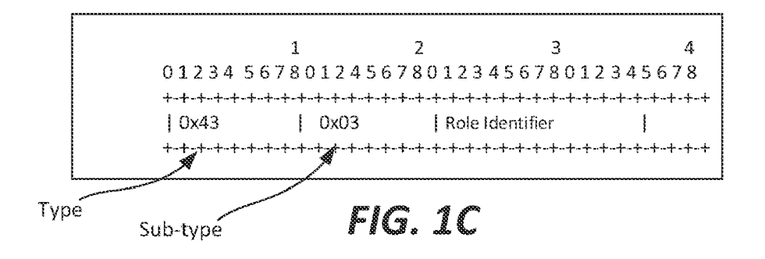
FIG. 1C schematically illustrates a Border Gateway Protocol (BGP) extended community field for propagation of role information, according to an example.

Further, the role manager 158 may create a BGP extended community field carrying the role identifier. In an example, the BGP extended community field is tagged as an attribute to a route advertisement message, such as a EVPN type 2 message, that publishes NLRI between BGP EVPN peers in a VXLAN. In an example; the BGP extended community is a 4 octet value that may be divided into three main sections, as shown in FIG. 1C. The first octet of the BGP extended community field encode a type field; the second octet encodes a sub-type field, while the last two octets carry a unique set of data in a format defined by the type and sub-type fields.

In an example, the BGP extended community field is an opaque community field. In an example, the role manager 158 defines a type of the BGP extended community field as (0*43) indicating that the community field is an extended community and a sub-type of the BGP extended community field as (0*03) indicating that it is an opaque field. The opaque filed indicates that members categorized within the community are allowed to read the information in the community field, whereas, non-members of the community which are unable to recognize the BGP extended community field are configured to ignore the BGP extended community field and forward the packet to its next hop. In an example, the members of the community include switches manufactured by a specific Original Equipment Manufacturer (OEM). Switches from other OEMs forwarding messages received from the switch 102-1 may not be able to read the extended community field and since the BGP extended community field is opaque such switches are configured to ignore the field and forward the packet to its next hop or destination. In an example, the BGP extended community field is a non-transitive community field, i.e., the field is not applicable beyond the boundary of an Autonomous System (AS). Further, the role manager 158 of the switch 102-1 attaches the BGP extended community field with the route advertisement message.

The route manager 160 of the switch 102-1 then sends the route advertisement message to another network switch. In an example, the switch 102-1 broadcasts the route advertisement message in VLAN 120. Since, the switch 102-2 is part of VLAN 120, it receives the broadcasted route advertisement message including the BGP extended community field carrying the role identifier. On receipt of the route advertisement message the other network switch is aware of the network access policies to be implemented for the host device.

In response to receiving the route advertisement message, the switch 102-2 may create a host Media Access Control (MAC) address to role mapping based on the role identifier. This MAC address to role mapping may be stored in a switching table of the switch 102-2. The switching table in general contains MAC addresses of host devices and the switch ports on which the MAC addresses were learned or statically configured. In response to receiving the route advertisement message, the MAC to role mapping may be added to the switching table of the switch 102-2. Frames are forwarded by looking up the destination MAC address in the switching table. Frames are sent out the corresponding switch port.

Consider that the host device 110 roams out of a range of the WAP 103-1 and transitions into a range of the WAP 103-2, as denoted by arrow 112. With reference to FIG. 1A, the host device 110 shown with dashed lines depict the new position of the host device 110 when it roams from WAP 103-1 to WAP 103-2. In an example, a user of the host device 110 may move from one floor of the building to another floor of the building which may cause the host device 110 to roam from WAP 103-1 to WAP 103-2. Once the host device 110 roams from WAP 103-1 to WAP 103-2, the host device 110 may send a request to associate with the WAP 103-2. In an example, WAP 103-2 may authenticate the host device 110 and associate with the same. In some other examples, the host device 110 may be roaming using fast roaming techniques and may instantly associate with the WAP 103-2 once it roams away from the range of the WAP 103-1 and transitions into the range of the WAP 103-2. Fast roaming, also referred to as IEEE 802.11r or Fast BSS Transition (FT), allows a host device to roam quickly in environments implementing WPA2 Enterprise security, such that the client device does not need to re-authenticate to an authentication server, such as a RADIUS server, every time it roams from one WAP to another. In an example, with fast roaming, after the host device 110 connects to the WAP 103-1, the WAP 103-1 identifies the host device 110 as an authenticated device for all WAPs in the broadcast domain, such as VLAN 120 of FIG. 1A. When a host device roams to a new WAP, information from the original association is passed to the new WAP to provide the host device with credentials. The new WAP therefore knows that the host device has already been approved by the authentication server, and thus need not repeat the whole authentication process which enables faster/instant association with the new WAP.

In response to the host device 110 transitioning from the WAP 103-1 to WAP 103-2 connected to the switch 102-2 and associating with the WAP 103-2, the switch 102-2 may determine that the host device 110 is locally connected to the switch 102-2. A host device locally connected to a switch may be understood as the host device being associated with a WAP connected to the switch. In an example, the switch 102-2 may scan wireless access ports of the switch 102-2 and based on MAC learnings of the WAP 103-2 may determine that the host device 110 is locally connected to the switch 102-2. In response to determining that the host device 110 is locally connected to the switch 102-2, the switch 102-2 may compare the MAC address of the host device 110 against entries in its switching table. If there is a match, the switch 102-2 may configure its data plane for network policy enforcement of the host device 110 based on the MAC address to role mapping. Thus, network policies associated with the role information of the host device 110 may be implemented in the switch 102-2, in response to the host device 110 transitioning from the WAP 103-1 to 103-2, since the role information of the host device 110 is already propagated to the switch 102-2. Further, in an example, in response to the host device 110 disconnecting from the WAP 103-2, the switch 102-2 may clear the network policies from its data plane. Accordingly, hardware space of the data plane of the switch 102-2 is not consumed in storing the network policies if the host device is not locally attached to the switch 102-2.

Figure 2:
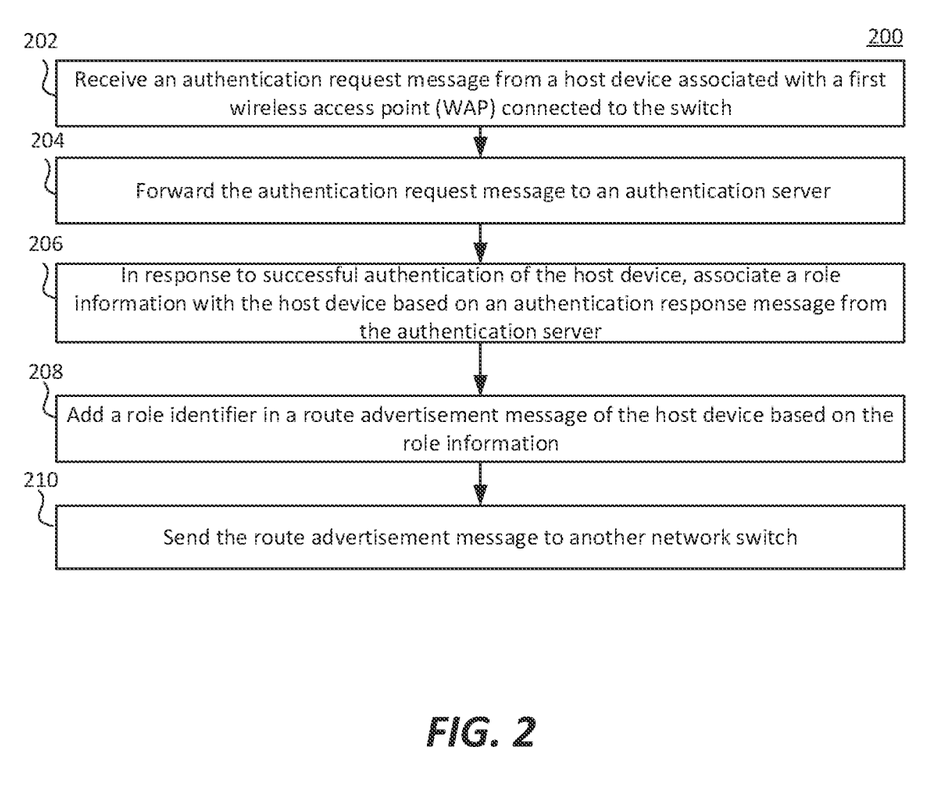
FIG. 2 is a flowchart illustrating a method for role information propagation, according to an example.

FIG. 2 is a flowchart illustrating a method 200 for role information propagation in switches, according to an example. Method 200 may be executed on a wired network switch, such as the switch 102-1 in an access layer A of a computing environment 100 FIG. 1.

At block 202, a switch may receive an authentication request message from a host device associated with a first WAP connected to the switch. In an example, the switch is configured as VTEP in a BGP EVPN based VXLAN. The switch may be one of multiple switches in an access layer of a CAN. Each of the multiple switches may be configured to perform the method of block 202. The host device may send the authentication request to establish a connection with the network.

At block 204, the switch may forward the authentication request message to an authentication server, such as a RADIUS server. In an example, the switch may function as a authentication proxy service which forwards and receives authentication messages on behalf of the host device.

At block 206, in response to successful authentication of the host device, the switch may associate a role information with the host device based on an authentication response message from the authentication server. In an example, the authentication response message from the authentication server may include the role information.

At block 208, the switch may add a role identifier in a route advertisement message of the host device based on the role information. In an example, the switch may create a BGP extended community field carrying the role identifier indicative of network policies to be implemented for the host device and may attach the BGP extended community field with the route advertisement message.

At block 210, the switch may send the route advertisement message to another network switch, where the another network switch is configured as a peer VTEP in the VXLAN. In an example, the network switch and the another network switch is configured in a single VLAN. On receipt of the route advertisement message the other network switch is aware of the network access policies to be implemented for the host device.

Figure 3A:
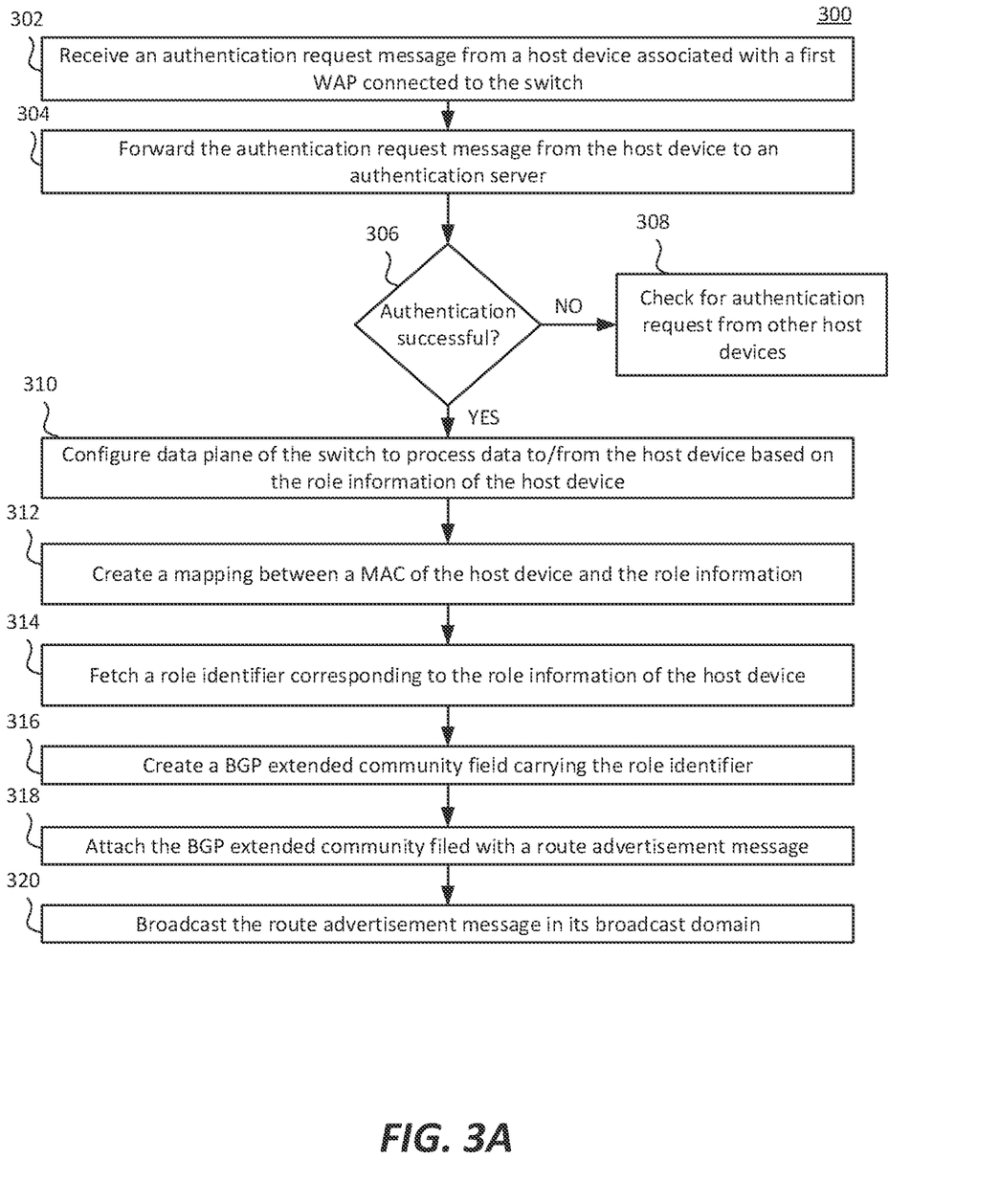
FIGS. 3A & 3B are flowcharts illustrating another method for role information propagation, according to an example.

FIG. 3 is a flowchart illustrating a method 300 for role information propagation in switches, according to an example. Method 300 may be executed on a wired switch, such as the switch 102-1 in an access layer A of a computing environment 100 FIG. 1.

Consider that there are multiple interconnected switches in an access layer of network. The switch may receive an authentication request message from a host device associated with a first WAP connected to the switch, at block 302. In an example, the switch may interact with an authentication server (not shown) to process the authentication request message. The authentication request message may include access credentials, such as username and password of a user of the host device. The switch forwards the authentication request to the authentication server, at block 304.

Based on the access credentials the authentication server, such as RADIUS, may validate the identity of the user of the host device and authorize network access for the user of the host device. In an example, the switch may include an authentication client proxy service which may forward the authentication request message from the host device to the authentication server. The authentication server may maintain a central database of user profiles. The authentication server matches the user credentials against the database of user profiles. If there is a match, the authentication server may check for role information associated with the user. The role information is indicative of a group/category of the user of the host device connecting to the network based on which network access policy or profile of the user is determined. The authentication server may send an authentication response message indicative of successful authentication of the host device. The switch may check whether the authentication successful, at block 306. On receiving the authentication response message indicative of successful authentication from the authentication server the switch may determine that the authentication is successful ("YES" branch from block 306). In case of non-receipt of the authentication successful message, the switch determines that the authentication has failed ("No" branch from block 306), and may proceed to check for authentication requests from other host devices, at block 308.

In response to successful authentication of the host device, the switch may associate the role information with the host device based on the authentication response message from the authentication server. Thus, at block 310, the switch may configure its data plane to process data to/from the host device based on the role of the host device and thus associate the role information with the host device.

Since, the switch receives the authentication response message from the authentication server the switch is aware of the role information included in the authentication response message. At block 312, the switch may create a mapping between a MAC of the host device and the role information, say "Guest", from the authentication response message. In an example, the role identifier is a 16 bit numerical value indicating that the role of the host device. At block 314, the switch may fetch a role identifier corresponding to the role information of the host device from a role identifier table. The role identifier table may include a mapping of role information to role identifier. In an example, the role identifier table may be stored in the switch and may be predefined by a network administrator.

At block 316, the switch may create a BGP extended community field carrying the role identifier. In an example, the BGP extended community field is tagged as an attribute to a route advertisement message, such as a EVPN type 2 message, that publishes NLRI between BGP EVPN based peer VTEPs in a VXLAN. In an example, the BGP extended community is a 4-octet value that may be divided into three main sections. The first octet of the BGP extended community field encode a type field, the second octet encodes a sub-type field, while the last two octets carry a unique set of data in a format defined by the type and sub-type fields.

In an example, the BGP extended community field is an opaque community field. In an example, the switch defines a type of the BGP extended community field as (0*43) indicating that the community field is an extended community and a sub-type of the BGP extended community field as (0*03) indicating that it is an opaque field. The opaque filed indicates that members categorized within the community are allowed to read the information in the community field, whereas, non-members of the community which are unable to recognize the BGP extended community field are configured to ignore the BGP extended community field and forward the packet to its next hop. In an example, the members of the community include switches manufactured by a specific Original Equipment Manufacturer (OEM). Switches from other OEMs forwarding messages received from the switch may not be able to read the extended community field and since the BGP extended community field is opaque, such switches ignore the field and forward the packet to its next hop. An example of the BGP extended community field is shown in FIG. 1C. The switch then attaches the BGP extended community field with the route advertisement message, at block 318.

At block 320, The switch broadcasts the route advertisement message in its broadcast domain. Thus, other switches in the same broadcast domain receives the route advertisement message with the BGP extended community field. On receipt of the route advertisement message the other network switches is aware of the network access policies to be implemented for the host device.

Figure 3B:
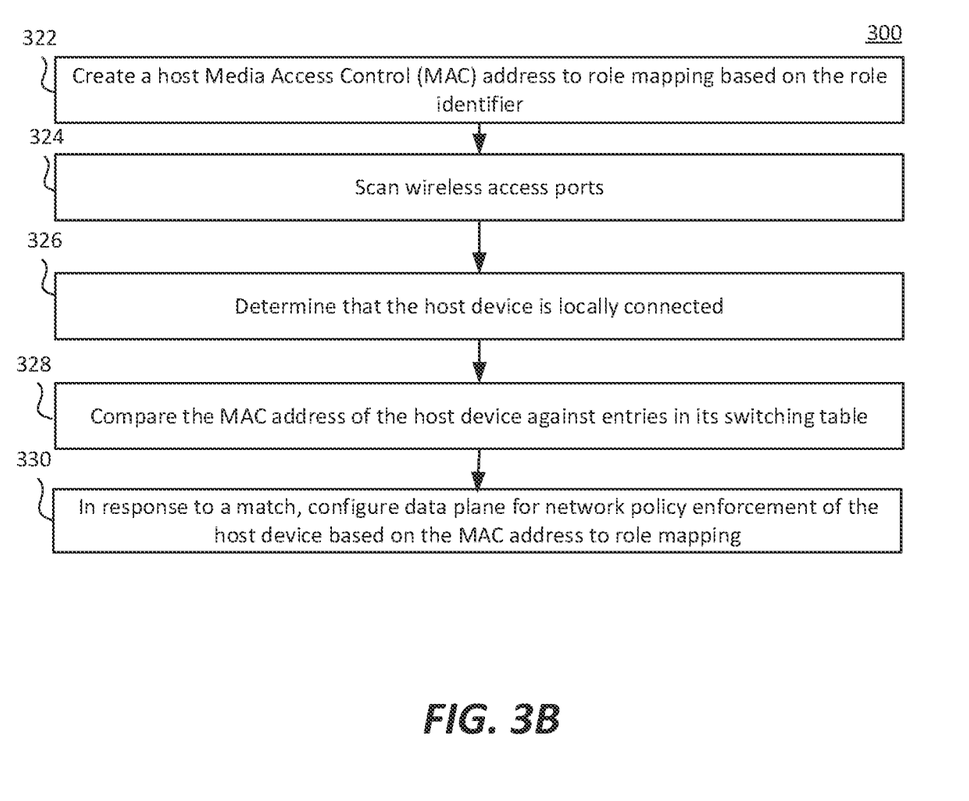

FIG. 3B illustrates steps of the method 300 performed by another switch receiving the route advertisement message. Referring to FIG. 3B, in response to receiving the route advertisement message, another switch in the broadcast domain creates a host Media Access Control (MAC) address to role mapping based on the role identifier, at block 322. This MAC address to role mapping may be stored in a switching table of the other switch. The switching table in general contains MAC addresses of host devices and the switch ports on which the MAC addresses were learned or statically configured. In response to receiving the route advertisement message, the MAC to role mapping may be added to the switching table of the switch 102-2. Frames are forwarded by looking up the destination MAC address in the switching table. Frames are sent out the corresponding switch port.

Consider that the host device roams out of a range of the first WAP and transitions into a range of a second WAP connected to the other switch. In an example, a user of the host device may move from one floor of the building to another floor of the building which may cause the host device to roam from the first WAP to the second WAP. Once the host device roams from first WAP to the second WAP, the host device may send a request to associate with the second WAP. In an example, the second WAP may authenticate the host device and associate with the same. In some other examples, the host device may be roaming using fast roaming techniques and may instantly associate with the second WAP once it roams away from the range of the first WAP and transitions into the range of the second WAP.

At block 324, the switch may scan its wireless access ports. Using MAC learnings of the second WAP, the switch may check whether the MAC address of the host device matches with any of the MAC addresses learnt for one of its Wireless access ports. If there is a match, the switch may determine that the host device is locally connected to it, at block 326. A host device locally connected to a switch may be understood as the host device being associated with a WAP connected to the switch. In response to determining that the host device is locally connected to the switch, the switch may compare the MAC address of the host device against entries in its switching table, at block 328. In response to a match, the switch may configure its data plane for network policy enforcement of the host device based on the MAC address to role mapping, at block 330. Thus, network policies associated with the role information of the host device may be implemented in the other switch, in response to the host device transitioning from the first WAP to the second WAP. This is because, the role information of the host device has already been propagated to the other switch with the route advertisement message. In response to the host device roaming from the first WAP to the second WAP, the other switch may enforce network policies of the host device based on the role information of the host device obtained as a result of the MAC address to role mapping created by the other switch.

Figure 4:
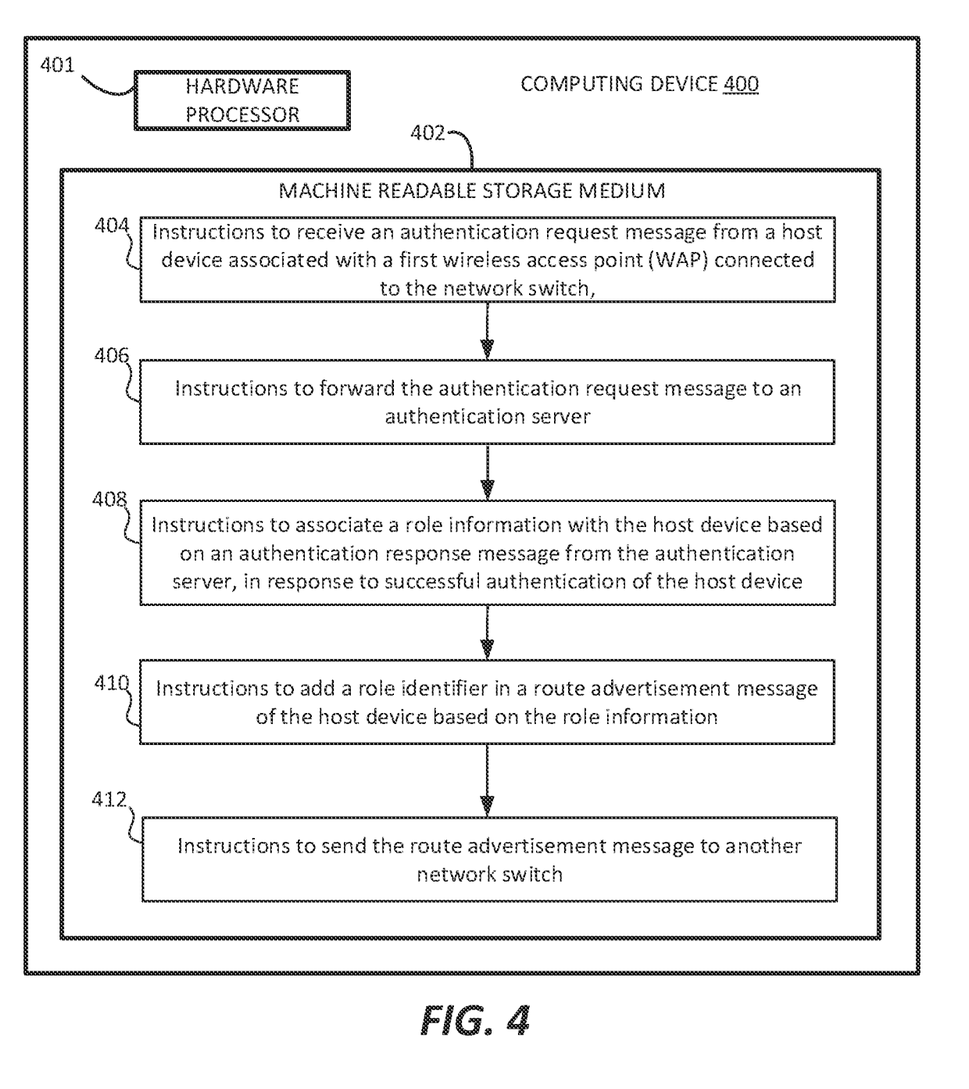
FIG. 4 illustrates a computing device for implementing the method for role information propagation, according to an example.

FIG. 4 is an example computing device 400, with a hardware processor 401, and accessible machine-readable instructions stored on a machine-readable medium 402 for implementing one example system, according to one or more disclosed example implementations. In an example, the computing device 400 may be a network switch, such as the switch 102, described above in reference to FIG. 1. FIG. 4 illustrates computing device 400 configured to perform instructions 404-412 described below. However, computing device 400 may also be configured to perform the flow of other methods, techniques, functions, or processes described in this disclosure, such as, for example the method 200 of FIG. 2.

A processing element such as processor 401 may contain one or more hardware processors, where each hardware processor may have a single or multiple processor cores. In one embodiment, the processor 401 may include at least one shared cache that stores data (e.g., computing instructions) that are utilized by one or more other components of processor 401. For example, the shared cache may be a locally cached data stored in a memory for faster access by components of the processing elements that make up processor 401. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 4, the processing elements that make up processor 401 may also include one or more of other types of hardware processing components, such as graphics processing units (GPU), application specific integrated circuits (ASICs), field-programmable gate arrays (FPGAs), and/or digital signal processors (DSPs).

The processor 401 may be operatively and communicatively coupled to a memory. The memory may be a non-transitory computer readable medium, such as the machine readable storage medium 402, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 402 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The machine readable medium 402 includes instructions 404 that, when executed by the processor 401, cause a switch to receive an authentication request message from a host device associated with a first WAP connected to a switch. The switch is configured as a VTEP in a BGP EVPN based VXLAN.

The instructions 406, when executed by the processor 401, cause the switch to forward the authentication request message to an authentication server. In response to successful authentication of the host device, the instructions 408, when executed by the processor 401, cause the switch to associate a role information with the host device based on an authentication response message from the authentication server. The instructions 410, when executed by the processor 401, cause the switch to add a role identifier in a route advertisement message of the host device based on the role information. In an example, the switch may create a BGP extended community field carrying the role identifier indicative of network policies to be implemented for the host device and attach the BGP extended community field with the route advertisement message. The instructions 412, when executed by the processor 401, cause the switch to send the route advertisement message to another network switch, where the another network switch is configured as a peer VTEP in the VXLAN. The switch and the another network switch is configured in a single Virtual Local Area Network (VLAN). On receipt of the route advertisement message the other network switch is aware of the network access policies to be implemented for the host device.

A network switch or switch, as used in the examples herein, forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

WAPs are included as an example of a point of access to a network, such as network 100 of FIG. 1. The WAPs may control network access of the host devices and may authenticate the host devices for connecting to the WAPs and through the WAPs, to other devices within the network. Each of WAPs may be a combination of hardware, software, and/or firmware that is configured to provide wireless network connectivity to wireless host devices. In the illustrated example, WAPs can be managed and configured by a controller. WAPs communicate with the controller and the network over connections which may be wired or wireless interfaces.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

We claim:

1. A network switch comprising:
a processor; and
a non-transitory, computer-readable medium including instructions that, when executed by the processor, cause the network switch to:
receive an authentication request message from a host device associated with a first wireless access point (WAP) connected to the network switch, wherein the network switch is configured as a VXLAN Tunnel Endpoint (VTEP) in a Border Gateway Protocol (BGP) Ethernet Virtual Private Network (EVPN) based Virtual Extensible Local Area Network (VXLAN);
forward the authentication request message to an authentication server;
in response to receiving an authentication response message from the authentication server, associate a role information with the host device based on the authentication response message;
add a role identifier to a route advertisement message of the host device based on the role information, wherein the route advertisement message is indicative of a mapping between an Internet Protocol (IP) address of the host device and a Media Access Control (MAC) address of the host device, wherein to add the role identifier the network switch is to:
create a BGP extended community field carrying the role identifier indicative of network access policies to be implemented for the host device; and
attach the BGP extended community field with the route advertisement message; and
send the route advertisement message to another network switch, wherein the another network switch is configured as a peer VTEP in the VXLAN, and the network switch and the another network switch is configured in a single Virtual Local Area Network (VLAN), and wherein on receipt of the route advertisement message the other network switch is aware of the network access policies to be implemented for the host device.

2. The network switch of claim 1, wherein the BGP extended community field is an opaque community field.

3. The network switch of claim 1, wherein the BGP extended community field is a non-transitive community field.

4. The network switch of claim 1, wherein the route advertisement message is a BGP EVPN type 2 route.

5. The network switch of claim 1, wherein the BGP extended community field comprises four octets.

6. The network switch of claim 1, wherein the role identifier is a sixteen-bit value starting from the least significant bit of the BGP extended community field.

7. The network switch of claim 1, wherein the BGP extended community filed comprises:
a type information indicating that the BGP extended community field is a non-transitive opaque extended community; and
a sub type information indicating that the BGP extended community filed is carrying the role identifier.

8. The network switch of claim 1, wherein the network switch is an access switch at a customer edge.

9. A method comprising:
receiving, by a network switch, an authentication request message from a host device associated with a first wireless access point (WAP) connected to the network switch, wherein the network switch is configured as a VXLAN Tunnel Endpoint (VTEP) in a Border Gateway Protocol (BGP) Ethernet Virtual Private Network (EVPN) based Virtual Extensible Local Area Network (VXLAN);
forwarding, by the network switch, the authentication request message to an authentication server;
in response to successful authentication of the host device, associating, by the network switch, a role information with the host device based on an authentication response message from the authentication server;
adding, by the network switch, a role identifier in a route advertisement message of the host device based on the role information, wherein the route advertisement message is indicative of a mapping between an Internet Protocol (IP) address of the host device and a Media Access Control (MAC) address of the host device, wherein adding the role identifier comprises:
creating a BGP extended community field carrying the role identifier indicative of network policies to be implemented for the host device; and
attaching the BGP extended community field with the route advertisement message; and
sending, by the network switch, the route advertisement message to another network switch, wherein the another network switch is configured as a peer VTEP in the VXLAN, the network switch and the another network switch is configured in a single Virtual Local Area Network (VLAN), and wherein on receipt of the route advertisement message the other network switch is aware of the network access policies to be implemented for the host device.

10. The method of claim 9, wherein the BGP extended community field is an opaque community field.

11. The method of claim 9, wherein the BGP extended community field is a non-transitive community field.

12. The method of claim 9, wherein the route advertisement message is a BGP EVPN type 2 route.

13. The method of claim 9, wherein the BGP extended community field comprises four octets.

14. The method of claim 9, wherein the BGP extended community filed comprises:
- a type information indicating that the BGP extended community field is a non-transitive opaque extended community; and
- a sub type information indicating that the BGP extended community filed is carrying the role identifier.

15. The method of claim 9, wherein the network switch is an access switch at a customer edge.

16. The method of claim 9, further comprising, creating, by the another network switch, a host Media Access Control (MAC) address to role mapping based on the role identifier obtained from the route advertisement message received from the network switch.

17. The method of claim 16, further comprising, enforcing, by the another network switch and as a result of the creating the MAC address to role mapping, network policies of the host device based on the role of the host device, in response to the host device roaming from the first WAP to a second WAP connected to the another network switch.

18. The method of claim 16, further comprising, configuring, by the another network switch a data plane for network policy enforcement of the host device based on the MAC address to role mapping, in response to the host device roaming from the first WAP to a second WAP connected to the another network switch.

19. A non-transitory, computer readable medium including instructions that, when executed by a processor, cause a network switch to:
- receive an authentication request message from a host device associated with a first wireless access point (WAP) connected to the network switch, wherein the network switch is configured as a VXLAN Tunnel Endpoint (VTEP) in a Border Gateway Protocol (BGP) Ethernet Virtual Private Network (EVPN) based Virtual Extensible Local Area Network (VXLAN);
- forward the authentication request message to an authentication server;
- in response to successful authentication of the host device, associate a role information with the host device based on an authentication response message from the authentication server;
- add a role identifier in a route advertisement message of the host device based on the role information, wherein the route advertisement message is indicative of a mapping between an Internet Protocol (IP) address of the host device and a Media Access Control (MAC) address of the host device, wherein to add the role identifier the network switch is to:
  - create a BGP extended community field carrying the role identifier indicative of network policies to be implemented for the host device; and
  - attach the BGP extended community field with the route advertisement message; and
- send the route advertisement message to another network switch, wherein the another network switch is configured as a peer VTEP in the VXLAN, the network switch and the another network switch is configured in a single Virtual Local Area Network (VLAN), and wherein on receipt of the route advertisement message the other network switch is aware of the network access policies to be implemented for the host device.

20. The non-transitory computer-readable medium of claim 19, wherein the BGP extended community field is an opaque and non-transitive community field.

\* \* \* \* \*